United States Patent [19]

Stettner

[11] Patent Number: 4,515,129

[45] Date of Patent: May 7, 1985

[54] EDGE DISCHARGE PULSE FUEL INJECTOR

[75] Inventor: Ernest R. Stettner, Spencerport, N.Y.

[73] Assignee: General Motors Corporation, Detroit, Mich.

[21] Appl. No.: 503,070

[22] Filed: Jun. 10, 1983

[51] Int. Cl.[3] .................... F02M 39/00; F16K 31/04

[52] U.S. Cl. .................... 123/472; 123/474; 239/585; 251/141

[58] Field of Search .................... 123/472, 473, 474, 470; 250/141, 139, 129; 239/585, 584

[56] References Cited

U.S. PATENT DOCUMENTS

| | | | |
|---|---|---|---|
| 2,881,980 | 4/1959 | Beck et al. | 239/562 |
| 3,926,405 | 12/1975 | Arnold | 251/129 |
| 4,356,980 | 11/1982 | Krauss | 239/585 |
| 4,366,944 | 1/1983 | Kah | 251/141 |
| 4,394,973 | 7/1983 | Sauer | 239/585 |
| 4,418,886 | 12/1983 | Holzer | 251/141 |
| 4,437,644 | 3/1984 | Wilmers | 123/472 |
| 4,455,982 | 6/1984 | Hafner | 123/472 |

*Primary Examiner*—Carl Stuart Miller
*Attorney, Agent, or Firm*—Arthur N. Krein

[57] ABSTRACT

An edge discharge pulse fuel injector for discharging fuel to the cylinder of an internal combustion engine has a housing with a bore extending axially therein receiving an orifice plate fixed in one end thereof to partly enclose that one end, with the orifice plate having a valve seat surface and an opposed outboard surface with an orifice passage extending therethrough that is located radially outward from the axis of the housing. A solenoid means is fixed in the opposite end of the housing, the solenoid means including a pole piece means with a working surface positioned at right angles to the housing axis and in axial spaced apart opposed relationship to the valve seat surface to define a fuel chamber therewith within the housing which is adapted to receive fuel. An armature valve disc is operatively positioned in the fuel chamber for movement between the opposed working surface of the pole piece and the valve seat surface; and, a spring is operatively associated with this armature valve disc to normally bias it into seating engagement with the valve seat surface. One of the armature valve disc or valve seat surface presenting a surface inclined at an angle to the housing axis whereby the axial movement of the armature valve disc between the valve seat surface and the working surface of the pole piece means is greater adjacent to the orifice passage than at a location 180° diametrically opposite thereof.

3 Claims, 6 Drawing Figures

EDGE DISCHARGE PULSE FUEL INJECTOR

FIELD OF THE INVENTION

This invention relates to an electromagnetic fuel injector and, in particular, to an edge-discharge pulse injector.

DESCRIPTION OF THE PRIOR ART

Various types of electromagnetic fuel injectors are presently used in the fuel injection systems of internal combustion engines. Such systems are either of the throttle body injection type or a port injection type. In a throttle body injection system one or more electromagnetic fuel injectors are mounted so as to supply fuel into the induction passage of a throttle body for delivery to the cylinders of an engine. In a port injection type fuel system, a plurality of electromagnetic fuel injectors are used, one for each cylinder, with each such fuel injector being located in the intake manifold of an engine so as to supply fuel only toward the intake valve of an associate cylinder.

However, the known electromagnetic fuel injectors that are suitable for use in such port injection fuel systems, are all of the central discharge type and, accordingly, the spray tip end thereof normally must extend into the intake air passage of the intake manifold for the associate cylinder so as to partly obstruct the air flow to the cylinder.

SUMMARY OF THE INVENTION

The present invention relates to an edge discharge pulse fuel injector for discharging fuel to the cylinder of an internal combustion engine as in a port injection type fuel system. The subject fuel injector includes a housing with an axial bore therethrough with an orifice plate fixed in the bore at one end of the housing and a solenoid assembly fixed in the other end of the housing in spaced apart relationship to the orifice plate to define therewith a fuel chamber adapted to be supplied with fuel. The orifice plate is provided with a valve seat surface and an orifice passage therethrough located adjacent to a peripheral edge thereof for edge discharge of fuel from the injector. Flow through the orifice passage in the orifice plate is controlled by an armature valve disc with either the armature valve disc or orifice plate presenting a surface inclined at an angle to the axial bore whereby the axial movement of the armature valve disc between the valve seat surface and the working surface of the solenoid assembly is greater adjacent to the valve seat surface than at a location diametrically opposite thereof.

A primary object of the present invention is to provide an improved electromagnetic fuel injector having a discharge orifice passage means located adjacent to an outer peripheral edge thereof whereby the injector can be mounted in the intake manifold of an engine so as to minimize obstruction of the air intake passage to an associate cylinder.

Another object of the invention is to provide an improved electromagnetic fuel injector wherein one of the opposed surfaces of an armature valve disc and the valve seat surface encircling a discharge orifice passage in an associate orifice plate is inclined relative to the reciprocating axis of an armature valve disc whereby the average working air gap between the armature valve disc and pole piece is reduced to thereby increase the magnetic force and to reduce fuel displacement by the armature valve disc movement.

Still another object of the present invention is to provide an improved electromagnetic fuel injector of the above type which includes features of construction rendering it easy and inexpensive to manufacture and which is reliable in operation, and in other respects suitable for use in the port fuel injection systems of production motor vehicles.

For a better understanding of the invention, as well as other objects and further features thereof, reference is had to the following detailed description of the invention to be read in connection with the accompanying drawings:

DESCRIPTION OF THE PREFERRED EMBODIMENT

Figure 2:
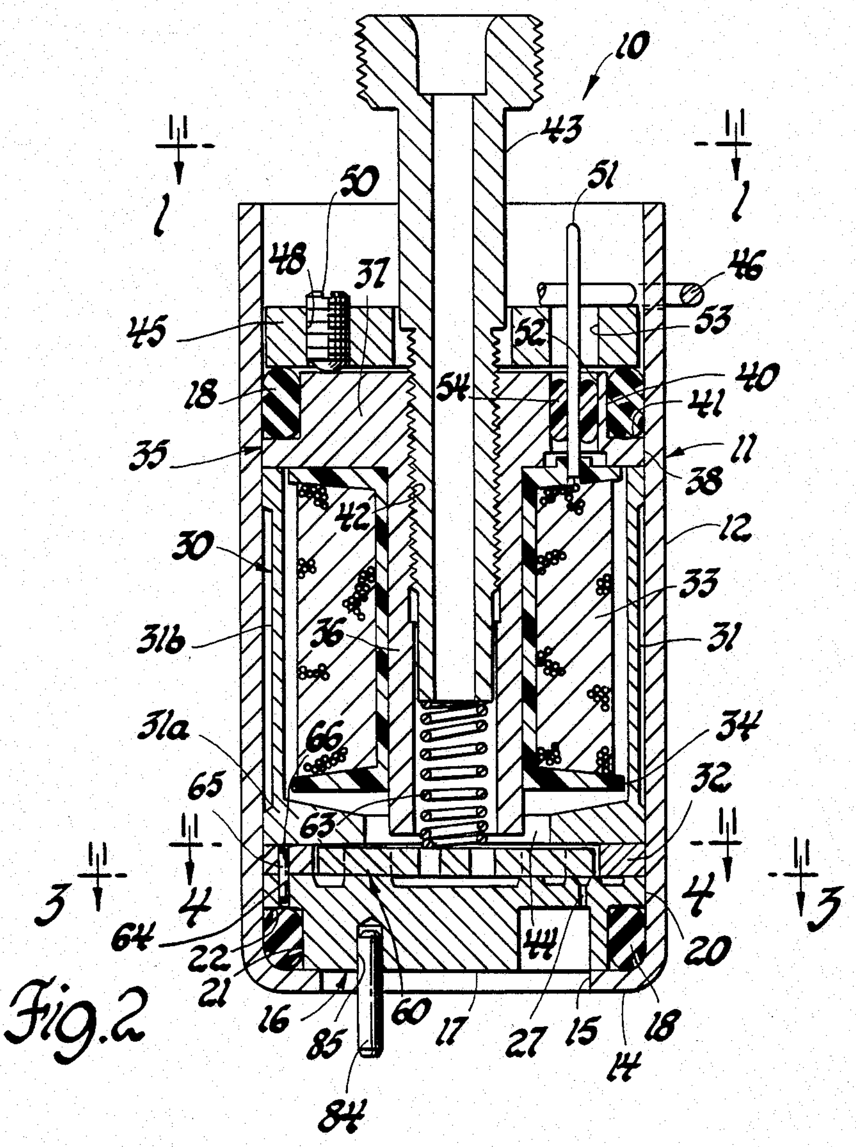
FIG. 2 is a longitudinal cross-sectional view of the subject injector taken along line 2—2 of FIG. 1.

Referring first to FIG. 2, the edge discharge pulse fuel injector, generally designated 10, has a housing 11 with a stepped axial bore therethrough whereby the housing is provided with an upper sleeve portion 12 and a radially inward extending support flange 14 at its lower end having the reduced diameter portion of the bore 15 extending therethrough.

An orifice plate 16 is positioned so that its lower or outboard surface 17 rests on the inboard surface of the support flange 14. An O-ring seal 18 is operatively positioned to effect a seal between the orifice plate 16 and the housing 11. For this purpose, in the construction shown, the orifice plate 16 is formed with a stepped circular external configuration so as to define an upper wall 20 of an external diameter so as to be slidably received by the interior wall of the sleeve portion 12 and, a lower reduced diameter wall 21 that is interconnected by a flat shoulder 22 to the upper wall 20, these last two parts thus defining an annular recess to receive the O-ring seal 18.

Figure 3:
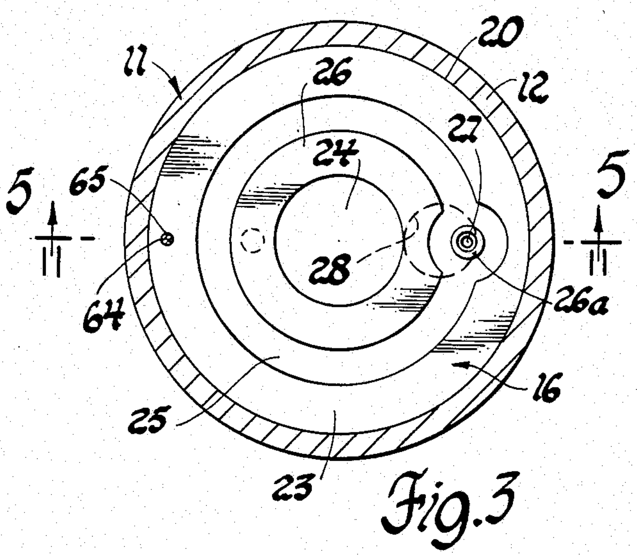
FIG. 3 is a cross-sectional view taken along line 3—3 of FIG. 2 to show the inboard surface of the orifice plate of the injector.

The top, with reference to FIG. 2, or inboard surface 23 of the orifice plate 16 is provided with a central recess 24 and with a concentric substantially annular groove 25 located a predetermined distance radially outboard of the recess 24 so as to define therebetween a substantially annular land or valve seat 26 and also a circular land or valve seat 26*a*, as best seen in FIG. 3.

An orifice discharge passage 27, of predetermined diameter as desired, extends from the center of the valve seat 26*a* so as to open into an enlarged bored discharge passage 28 that extends upward a suitable distance from the lower or outboard surface 17 of the orifice plate. As best seen in FIG. 2, the valve seat 26, the orifice passage 27 and the discharge passage 28 are located radially outward of the central axis of the orifice plate 16 and close to an outer peripheral edge thereof whereby the discharge passage 28 will be aligned so as to discharge fuel through the bore opening 15 closely adjacent to an edge thereof.

A solenoid assembly, generally designated 30, is positioned in the housing 11 so that the apertured base 31*a* of its tubular solenoid case 31, of suitable magnetic soft iron, abuts against a spacer ring 32 that rests on the outer radially inboard surface 23 of the orifice plate 16.

The solenoid assembly 30 further includes a solenoid coil 33 wound on a bobbin 34 that encircles a tubular pole piece 35 about its reduced diameter stem 36 portion. The pole piece 35, in the construction illustrated, further includes a circular upper flange portion 37 of stepped external configuration so as to define a circular lower wall 38, of a diameter to be slidably received in the housing 11, and an upper wall 40 of reduced diameter that is connected by a flat shoulder 41 to wall 38. Wall 40 and shoulder 41 thus define an annular recess to receive an O-ring seal 18 used to effect a seal between the housing 11 and the pole piece 35.

As illustrated, the bobbin 34 is positioned so that its upper flange abuts against the lower flange 37 surface, with the bobbin 34 and coil 33 thus being encircled by the tubular portion 31*b* of the solenoid case 31.

In the embodiment illustrated, the pole piece 35 is provided with an internally threaded through bore 42 to threadingly receive a fuel inlet tube 43 whereby fuel, as at a relatively low supply pressure, can be delivered to a fuel chamber 44 defined in part by the upper surface of the orifice plate 16, the internal peripheral surface of the spacer ring 32 and a lower portion of the solenoid case 31.

In the construction shown, the pole piece is axially positioned within the housing 11 so that its flange portion 37 abuts against the upper end of the solenoid case 31 by means of a centrally apertured retainer disc 45, which in turn is held against axial movement in one direction, upward with reference to FIG. 2, by means of a C-shaped wire retainer 46.

Figure 1:
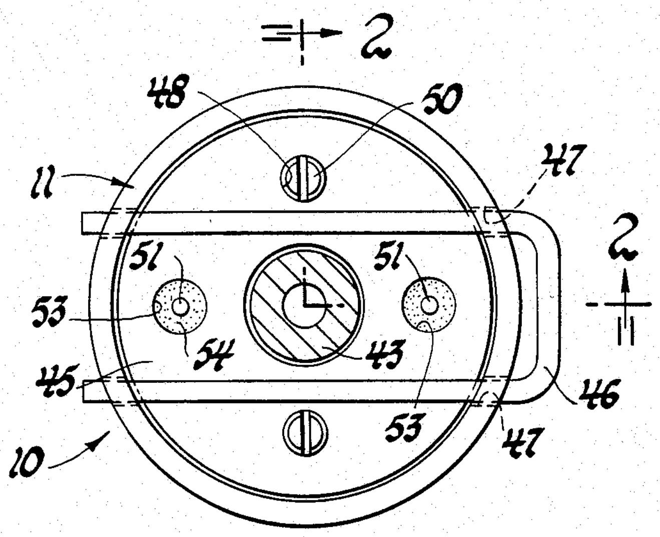
FIG. 1 is a top view of an edge discharge pulse fuel injector in accordance with a preferred embodiment of the invention.

As best seen in FIG. 1, the legs of the retainer 46 are slidably received through spaced apart apertures 47 provided in the housing 11 whereby the legs of the retainer 46 can be positioned to overlie the upper surface of the retainer disc with the inlet tube 43 extending loosely upward therebetween. In addition, the retainer disc 45 is provided with a pair of circumferentially spaced apart threaded apertures 48. Each such internally threaded aperture 48 is adapted to receive a set screw 50 which can be torqued into abutment against the upper surface of the pole piece 35 to effect axial positioning thereof.

The solenoid coil 33 is adapted to be supplied with an electrical power, via a pair of terminal leads 51 that extend through suitable apertures 52 provided for this purpose in the flange 37 of the pole piece 35 and through similar apertures 53 in the retainer disc 45. In the construction shown, the leads 51 are suitably electrically insulated from the pole piece 35 as by means of a suitable solidifying sealant 54, as shown in FIG. 2.

Fuel flow from the fuel chamber 44 out through the orifice passage 27 is controlled by an armature valve disc 60 that is loosely received within the central opening of the spacer disc 32 for axial movement between the lower surface of the solenoid assembly and the valve seats 26 and 26*a* of the orifice plate 16.

Figure 4:
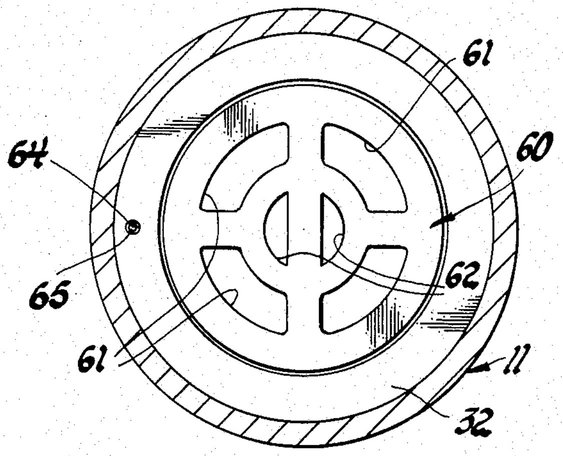
FIG. 4 is a cross-sectional view taken along line 4—4 of FIG. 2 to show details of the armature valve disc of the injector.

As best seen in FIG. 4, the armature valve disc 60 is provided with suitable circumferentially spaced apart through apertures, such as arcuate apertures 61 and 62 for the flow of fuel. As should be apparent, these apertures are suitably located so as to provide for an annular lower seating surface on this armature valve disc for seating engagement with valve seats 26 and 26*a*.

The armature valve disc 60 is normally biased into seating engagement with valve seats 26 and 26*a* by means of a coiled valve return spring 63 loosely received in the bore 42 of the pole piece 35. As shown in FIG. 2, the spring 63 is thus positioned to abut at one end against the lower end of the inlet tube 43 and at its other end against the armature valve disc.

Figure 5:
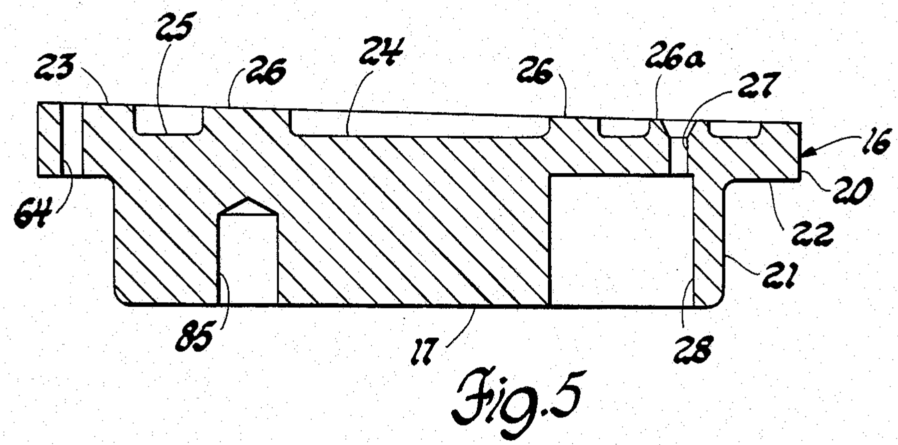
FIG. 5 is an enlarged cross-sectional view of the orifice plate, per se, of the injector taken along line 5—5 of FIG. 3; and, FIG. 6 is a cross-sectional view of a portion of an internal combustion engine showing the subject edge discharge pulse fuel injector mounted in the intake air passage for a cylinder of the engine.

Now in accordance with a feature of the invention, either lower surface of the armature valve disc or the inboard surface of the orifice plate 16, including the valve seats 26 and 26*a*, is formed so as to be inclined relative to the central axis of the injector assembly. In the preferred embodiment illustrated and as best seen in FIGS. 2 and 5, the upper or inboard surface of the orifice plate is inclined at a suitable angle relative to the central axis of the pole piece 35. Accordingly, in this embodiment, the opposed flat surfaces of the armature valve disc are formed parallel to each other and at right angles to the outer peripheral surface of the armature valve disc.

In this preferred embodiment, in order to insure that the opposed working surface of the solenoid assembly 30 will extend in a conventional manner at right angles to the central axis of the injector housing 11, the lower surface of the spacer ring 32 is also inclined at a complimentary angle to that of the upper surface of the orifice plate 16. Accordingly, suitable alignment means are provided to effect and maintain proper mating alignment of the oppositely inclined surface of the spacer ring 32 relative to the inclined upper surfaces of the orifice plate 16. For this purpose in the construction illustrated, alignment apertures 64 and 66 are suitably located in the orifice plate 16 and spacer ring 32 to receive an orientation pin 65.

As best seen in FIG. 2, the upper exposed surface of the orifice plate 16, including the valve seats 26 and 26*a* are so inclined that when the armature valve disc 60 is biased into seating engagement with the valve seats 26 and 26*a*, a normal working air gap, for example, of 0.005 inch will exist at the discharge orifice passage 27 side of the injector while diametrically opposite thereof the effective working air gap between the armature valve disc and the opposed working surface of the solenoid assembly will be reduced as desired, for example, to about 0.001 inch or less, as used in a particular injector application.

Thus in this example the air valve disc has approximately 0.005 inch travel over the valve seat 26*a* encircling the discharge orifice passage 27 but is restricted to about 0.001 inch or less travel at a location 180° from the orifice passage 27.

It should now be apparent that in a center type injector with comparable lift, all points of its associate armature lift the same distance whereas in the subject edge discharge injector, the armature, i.e., armature valve disc 60 works somewhat in the manner of a hinge principle, with very little travel at the hinge, i.e., the side with the approximate 0.001 inch working air gap.

With the subject arrangement, the average maximum working air gap of the magnetic circuit can be reduced up to approximately 50% as compared to a center discharge type injector. This increases the available magnetic pull on the armature and also reduces its travel distance. Both effects are operative to reduce armature response time and thus increase the dynamic range of controlling fuel discharge.

Also in the preferred embodiment shown, the armature valve disc is free to rotate. It should thus be appreciated that if this armature valve disc rotates its effective armature to valve seat 26*a* contact area will be increased many times, thus providing for increased wear characteristics and life of the armature valve disc.

Figure 6:
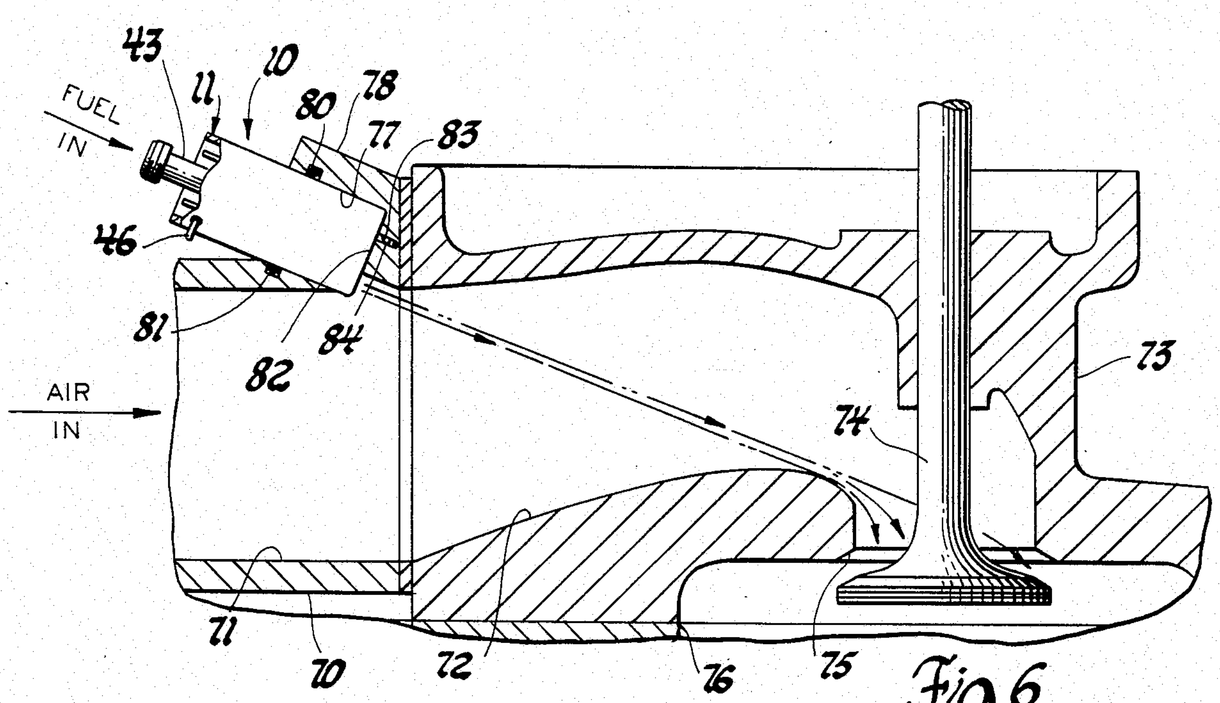

Referring now to FIG. 6, there is shown an exemplary mounting arrangement of an edge discharge pulse fuel injector 10, in accordance with the invention, in the intake manifold 70 of an internal combustion engine, only part of which is shown. As shown for a port fuel injection system, the discharge end of the injector 10 is located so as to permit the discharge of fuel into the flow passage 71 in the intake manifold 70 whereby an induction charge of air flowing through the manifold and injected fuel can flow via an intake passage 72 in the cylinder head 73 and through the valve 74 controlled intake port 75 into the associate cylinder 76 of the engine.

In the construction illustrated, the lower end of the housing 11 of the injector is positioned in a stepped bore opening 77 of a tubular stud 78, which in the construction shown, is formed integral with the intake manifold 70. A suitable sealing ring, such as O-ring 80, is received in an annular groove 81 in the wall of bore 77 to sealingly engage the exterior of the housing 11.

Now, since the subject injector 10 is an edge discharge injector, only one side of this injector, that is, the edge discharge side of the injector, need be aligned with the passage defined by the reduced diameter portion of bore 77. To effect this desired alignment, a suitable alignment means is provided. As illustrated in the construction shown, this alignment is effected by providing the interior stop wall 82 of the tubular stud 78 with an aperture 83 adapted to receive an alignment pin 84 that extends outward from this stop wall 82 so as to be received in an alignment aperture 85 provided in the orifice plate 16, as shown in FIG. 5. In the construction illustrated, this alignment aperture 85 is located in the orifice plate 16 at a location diametrically opposite the orifice passage 27.

Thus as illustrated, the edge discharge pulse fuel injector 10 can be easily mounted so as to target the fuel stream discharged therefrom, if desired, toward the inlet port 75 opening, without significantly obstructing the air intake passageway 72. Also the fuel discharge orifice from this injector 10 can be located close to the air stream in the flow passage 71 rather than being pocketed, as with conventional type center fuel injectors. This latter feature helps reduce surface tension collection of liquid fuel on the intake manifold walls.

While this invention has been described with reference to a particular embodiment disclosed herein, it is not intended to be confined to the details set forth since it is apparent that various modifications can be made by those skilled in the art without departing from the scope of the invention. For example, although the discharge orifice passage has been shown as being aligned parallel to the longitudinal axis of the subject injector, it is apparent that it can be skewed relative to this axis so as to direct the path of flow discharge from the injector, as desired. This application is therefore intended to cover such modifications or changes as may come within the purposes of the invention as defined by the following claims.

The embodiments of the invention in which an exclusive property or privilege is claimed are defined as follows:

1. An edge discharge pulse fuel injector for discharging fuel to the cylinder of an internal combustion engine including a housing means having a bore extending axially therein; an orifice plate fixed in said bore of said housing adjacent one end thereof to partly enclose said one end, said orifice plate having a valve seat surface and an opposed outboard surface with an orifice passage means extending therethrough that is located radially outward from said axis whereby fuel can be discharged from the injector next adjacent to one outer edge of said housing; a solenoid means fixed in said housing means, said solenoid means including a pole piece means with a flat working surface positioned at right angles to said axis and located in axial spaced apart opposed relationship to said valve seat surface whereby to define a fuel chamber therewith and with said housing means; a fuel supply means operatively associated with said housing means and having one end thereof connectable to a source of fuel and having its other end in flow communication with said fuel chamber; an armature valve means loosely positioned in said fuel chamber for movement between said opposed working surface of said pole piece means and said valve seat surface; and, a spring means operatively associated with said armature valve means to normally bias said armature valve means into seating engagement with said valve seat surface; one of said armature valve means and said valve seat surface presenting a surface inclined at an angle to said axis whereby the axial movement of said armature valve means between said valve seat surface and said working surface of said pole piece is greater adjacent to said orifice passage means than at a location diametrically opposite thereof.

2. An edge discharge pulse fuel injector for discharging fuel to the cylinder of an internal combustion engine including a housing means having an axial extending bore therethrough; an orifice plate fixed in said bore of said housing adjacent one end thereof to partly enclose said one end, said orifice plate having a valve seat surface and an opposed outboard surface with an orifice passage means extending therethrough that is located radially outward from said axis for the discharge of fuel near an outer edge of said housing means; a solenoid means fixed in said housing means, said solenoid means including a pole piece means defining a working surface positioned at right angles to said axis in axial spaced apart opposed relationship to said valve seat surface so as to define therewith a fuel chamber; a fuel supply means operatively associated with said housing means having one end thereof connectable to a source of fuel and having its other end in flow communication with said fuel chamber; an armature valve means freely positioned in said fuel chamber for movement between said opposed working surface of said pole piece and said valve seat surface; and, a spring means operatively associated with said armature valve means to normally bias it into seating engagement with said valve seat surface; said valve seat surface presenting a surface inclined at an angle to said axis whereby the axial movement of said armature valve means between said valve seat surface and said working surface of said pole piece is greater adjacent to said orifice passage means than at a location 180° opposite said orifice passage means.

3. An edge discharge pulse fuel injector for discharging fuel to the cylinder of an internal combustion engine, said injector including a housing means having a bore extending axially therein; an orifice plate fixed in said bore of said housing adjacent one end thereof to partly enclose said one end, said orifice plate having a valve seat surface means and an opposed outboard surface with an orifice passage means extending therethrough that is located radially outward from said axis for an edge discharge of fuel from the injector; said valve seat surface means being inclined at an angle to said axis, a solenoid means fixed in said housing, said solenoid means including a pole piece means with a working surface positioned at right angles to said axis and in axial spaced apart opposed relationship to said valve seat surface means to define therewith a fuel chamber; a fuel supply means operatively associated with said housing means and having one end thereof connectable to a source of fuel and having its other end in flow communication with said fuel chamber; an armature valve means loosely positioned in said fuel chamber for movement between said opposed working surface of said pole piece and said valve seat surface; and, a spring means operatively associated with said armature valve means to normally bias said armature valve means into seating engagement with said valve seat surface; said armature valve means having parallel flat opposed surfaces such that during operation the axial movement of said armature valve means between said valve seat surface and said working surface of said pole piece means will be greater adjacent to said orifice passage means than at a location 180° diametrically opposite thereof.

* * * * *